(12) United States Patent
Makino

(10) Patent No.: US 7,546,150 B2
(45) Date of Patent: Jun. 9, 2009

(54) FOLDING CELLULAR PHONE

(75) Inventor: Minoru Makino, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 11/295,452

(22) Filed: Dec. 7, 2005

(65) Prior Publication Data

US 2006/0172764 A1 Aug. 3, 2006

(30) Foreign Application Priority Data

Jan. 31, 2005 (JP) ............................. 2005-024070

(51) Int. Cl.
*H04M 1/00* (2006.01)
(52) U.S. Cl. ................. 455/575.1; 455/575.3; 455/566; 379/433.13; 379/433.04
(58) Field of Classification Search ............. 455/575.1, 455/575.3, 566; 379/433.13, 433.04
See application file for complete search history.

(56) References Cited

U.S. PATENT DOCUMENTS

| | | | |
|---|---|---|---|
| 5,629,833 A | 5/1997 | Ido et al. | |
| 5,708,561 A * | 1/1998 | Huilgol et al. | 361/681 |
| 6,233,139 B1 * | 5/2001 | Hamon | 361/681 |
| 6,266,045 B1 * | 7/2001 | Myerson et al. | 345/156 |
| 6,822,871 B2 | 11/2004 | Lee et al. | |
| 7,174,195 B2 * | 2/2007 | Nagamine | 455/575.1 |
| 2002/0073588 A1 * | 6/2002 | Reynolds et al. | 40/642.02 |
| 2003/0064758 A1 * | 4/2003 | Mizuta et al. | 455/566 |
| 2003/0153372 A1 * | 8/2003 | Shimamura et al. | 455/575 |
| 2003/0203747 A1 * | 10/2003 | Nagamine | 455/575.3 |
| 2004/0198474 A1 * | 10/2004 | Jung et al. | 455/575.1 |
| 2005/0113156 A1 | 5/2005 | Park et al. | |
| 2006/0019728 A1 * | 1/2006 | Sakamoto et al. | 455/575.3 |
| 2006/0162123 A1 * | 7/2006 | Cha | 16/239 |
| 2006/0199606 A1 * | 9/2006 | Makino | 455/550.1 |
| 2006/0246964 A1 * | 11/2006 | Castaneda et al. | 455/575.3 |
| 2007/0225052 A1 * | 9/2007 | Yamazaki et al. | 455/575.7 |
| 2007/0281666 A1 * | 12/2007 | Yoshida | 455/411 |
| 2007/0293283 A1 * | 12/2007 | Inubushi et al. | 455/575.1 |
| 2007/0298850 A1 * | 12/2007 | Miyata et al. | 455/575.3 |
| 2008/0045279 A1 * | 2/2008 | Ohki | 455/575.1 |
| 2008/0051162 A1 * | 2/2008 | Kim et al. | 455/575.3 |
| 2008/0078062 A1 * | 4/2008 | Hsu et al. | 16/367 |

(Continued)

FOREIGN PATENT DOCUMENTS

EP 1 422 911 A2 5/2004

(Continued)

*Primary Examiner*—Matthew D Anderson
*Assistant Examiner*—Minh D Dao
(74) *Attorney, Agent, or Firm*—Birch, Stewart, Kolasch & Birch, LLP

(57) ABSTRACT

A folding cellular phone includes a first housing provided with a liquid crystal display part on the surface thereof, a second housing including an operation part formed on the surface thereof and a hinge for connecting the first housing and the second housing in a pivotable manner to open/close the folding cellular phone. The liquid crystal display part is supported on the first housing by a support mechanism such that the orientation of the liquid crystal display part is changeable between portrait and landscape. The support mechanism is configured to support and guide the liquid crystal display part such that a bottom corner of the liquid crystal display part moves along the hinge when the orientation of the liquid crystal display part is changed between portrait and landscape.

13 Claims, 11 Drawing Sheets

U.S. PATENT DOCUMENTS

2008/0146295 A1 * 6/2008 Jorgensen et al. ........ 455/575.3

FOREIGN PATENT DOCUMENTS

| JP | 8-63259 A | 3/1996 |
| JP | 8-185242 A | 7/1996 |
| JP | 8-185243 A | 7/1996 |
| JP | 2001-142408 A | 5/2001 |
| JP | 2001-156893 A | 6/2001 |
| JP | 2002-341998 A | 11/2002 |
| JP | 2003-134205 A | 5/2003 |
| JP | 2003-319043 A | 11/2003 |
| JP | 2004-54409 A | 2/2004 |
| JP | 2004-78073 A | 3/2004 |
| JP | 2004-120513 A | 4/2004 |
| JP | 2004-253526 | 9/2004 |
| JP | 2004-302491 | 10/2004 |
| JP | 2000-20166 A | 1/2005 |
| KR | 10-2005-0049976 A | 5/2005 |
| WO | WO-2004/019308 A1 | 3/2004 |

* cited by examiner

FOLDING CELLULAR PHONE

CROSS-REFERENCE TO RELATED APPLICATION

This non-provisional application claims priority under 35 U.S.C. §119(a) of Japanese Patent Application No. 2005-24070 filed in Japan on Jan. 31, 2005, the entire contents of which are hereby incorporated by reference.

BACKGROUND OF THE INVENTION

1. Field of the Invention

The present invention relates to a folding cellular phone, particularly to a folding cellular phone in which a liquid crystal display part is supported to be able to change the orientation between landscape and portrait.

2. Description of Related Art

In recent years, cellular phones are provided with various capabilities in addition to the communication function, such as e-mail transmission/reception, digital camera shooting, recording/reproducing, television reception, scheduling and so on.

However, the chief function of the cellular phone is making and receiving calls. For greater portability and salability of the cellular phone, importance has been placed on downsizing and weight reduction. In view of operability, the cellular phone is vertically oriented and reduced in width.

When a liquid crystal display part of the cellular phone is fixed in the portrait orientation, a landscape image needs to be scaled down so that the image fits in the portrait screen or a viewer has to scroll the image horizontally to see the whole image.

If rotated 90 degrees, the landscape image is displayed full on the portrait display without scaling down. The liquid crystal display part and an operation part of the folding cellular phone come into sight when the cellular phone is opened. When the user rotates the cellular phone 90 degrees to see the landscape image, the operation part is also rotated 90 degrees. It is troublesome and difficult for the user to do input with the operation keys in such an unusual state.

To solve the problem, for example, Japanese Unexamined Patent Publication No. 2001-156893 discloses a folding cellular phone including a liquid crystal display part which is supported on a first housing such that the orientation thereof is changeable from portrait to landscape while the cellular phone itself is held in the portrait orientation. The liquid crystal display part of the folding cellular phone is supported by a support shaft arranged at a center portion thereof to extend vertical to the liquid crystal display part such that the liquid crystal display part is rotated 90 degrees about the support shaft.

In order to rotate the liquid crystal display part without contacting a hinge for connecting a first housing and a second housing in a pivotable manner to open/close the phone or a bulge formed below the first housing attached with the liquid crystal display part while preventing an increase in size and thickness of the cellular phone, the bottom side of the liquid crystal display part needs to be rounded to form an arc corresponding to the circumference of a circle having the support shaft as the center. In such a case, the liquid crystal display part cannot be enlarged.

For example, Japanese Unexamined Patent Publication No. 2003-319043 discloses a folding cellular phone including a support mechanism for supporting the liquid crystal display part on a first housing in a slidable and rotatable manner. The liquid crystal display part of the folding cellular phone first slides in the vertical direction and then rotates about a support shaft arranged at a center portion of the liquid crystal display part. Therefore, the liquid crystal display part does not contact the hinge or the bulge provided at the bottom side of the first housing. Thus, the liquid crystal display part is enlarged.

Further, Japanese Unexamined Patent Publication No. 2004-78073 discloses a support mechanism for a liquid crystal display device which makes it possible to change the orientation of the liquid crystal display part between portrait and landscape.

In the near future, digital terrestrial television broadcasting will begin in earnest. Unlike the conventional analog television broadcasting, the digital terrestrial television broadcasting provides so-called interactive services. For example, people can take part in a quiz show, do shopping or complete payment to a bank account through a television set.

If the cellular phone is configured to receive the digital terrestrial television broadcasting, the user needs to operate the keys looking at an image on the display screen. In general, television images are landscape-oriented. Therefore, in order to see the landscape television image as large as possible on the small liquid crystal display of the cellular phone, the liquid crystal display needs to be oriented landscape.

The cellular phone according to Japanese Unexamined Patent Publication No. 2003-319043, however, requires two kinds of movements, i.e., slide and rotation, to change the orientation. These movements cannot be achieved by a single hand, thereby complicating the operation.

Further, the liquid crystal display device according to Japanese Unexamined Patent Publication No. 2004-78073 is not required to reduce the size and weight as strictly as the cellular phone is. In addition, the liquid crystal display part of thereof is not so often changed between portrait and landscape orientation. Therefore, the switching mechanism is complicated and the operation thereof is also complicated.

SUMMARY OF THE INVENTION

The present invention has been achieved in view of the above-described problems. The present invention has added a twist to the support mechanism of the liquid crystal display part of the cellular phone to achieve an object of the present invention, i.e., to increase the size of the liquid crystal display part without increasing the size of the cellular phone itself and allow a user to change the orientation of the liquid crystal display part easily between portrait and landscape so that the user can handle the operation part easily looking at the liquid crystal display oriented portrait or landscape.

In order to realize the above-described object, according to the present invention, the orientation of the liquid crystal display part is changed between portrait and landscape while a bottom corner of the liquid crystal display part moves along the hinge.

Specifically, the present invention provides a folding cellular phone including a first housing provided with a liquid crystal display part on the surface thereof, a second housing including an operation part formed on the surface thereof and a hinge for connecting the first housing and the second housing in a pivotable manner to open/close the folding cellular phone.

The liquid crystal display part is supported on the first housing by a support mechanism such that the orientation of the liquid crystal display part is changeable between portrait and landscape and the support mechanism is configured to support and guide the liquid crystal display part such that a bottom corner of the liquid crystal display part moves along the hinge when the orientation of the liquid crystal display part is changed between portrait and landscape.

According to the above-described features, the liquid crystal display part is used in the portrait orientation when the main functions of the cellular phone such as making/receiving calls or sending/receiving e-mails are used. When the digital terrestrial television broadcasting is received or an e-mail is prepared or read in English, the liquid crystal display part is changed to the landscape orientation so that a landscape image is displayed full on the screen and the user does input with the operation keys of the operation part kept in the usual portrait orientation. In order to change the orientation of the liquid crystal display part between portrait and landscape, the user operates the liquid crystal display part supported on the first housing. At this time, the support mechanism guides the liquid crystal display part such that a bottom corner of the liquid crystal display part moves along the hinge. Specifically, as the liquid crystal display part moves while a certain clearance is kept from the hinge, the liquid crystal display part does not contact the hinge or the bulge formed below the first housing even if the bottom side of the liquid crystal display part is not rounded.

It is preferred that the horizontal center of the portrait- or landscape-oriented liquid crystal display part is positioned substantially at the horizontal center of the first housing.

Specifically, when a conventional support shaft for supporting the liquid crystal display part on the first housing is provided at a center portion of the liquid crystal display part and the horizontal center of the landscape-oriented liquid crystal display part is required to be positioned substantially at the horizontal center of the first housing, the liquid crystal display part must be reduced in length from the top end in accordance with the bottom end which has been worked for preventing the interference of the hinge or the bulge. As a result, the liquid crystal display part is reduced in size. According to the present invention, however, the support mechanism guides the liquid crystal display part such that the bottom corner thereof moves along the hinge upon changing the orientation to portrait or landscape. Therefore, there is no need of providing the conventional support shaft at the center portion of the liquid crystal display part. Thus, whether in the portrait or landscape orientation, the horizontal center of the liquid crystal display part is positioned substantially at the horizontal center of the first housing, i.e., the horizontal center of the operation part.

It is preferred that the support mechanism is a cam.

With the help of the simple cam, the liquid crystal display part is surely guided such that the bottom corner thereof moves along the hinge.

It is preferred that the cam is configured to support and guide the liquid crystal display part such that the bottom corner of the liquid crystal display part moves along the hinge to draw a linear locus when the orientation of the liquid crystal display part is changed between portrait and landscape and the liquid crystal display part has a linear side which comes to the bottom in the portrait orientation.

As the liquid crystal display part is guided by the cam to change the orientation such that the bottom corner of the liquid crystal display part moves along the hinge to draw a linear locus, the liquid crystal display part does not contact the hinge even if the liquid crystal display part has the linear bottom side.

It is preferred that the cam includes a horizontal guide groove which is formed in the first housing and extends in the horizontal direction in the form of an upward convex arc, a vertical guide groove which is formed in the first housing to extend straight in the vertical direction, a first guide pin which is arranged on the rear surface of the liquid crystal display part to slidably engage with the horizontal guide groove and a second guide pin which is arranged on the rear surface of the liquid crystal display part to slidably engage with the vertical guide groove.

The first guide pin of the liquid crystal display part is engaged with and slides on the horizontal guide groove, and at the same time, the second guide pin of the liquid crystal display part is engaged with and slides on the vertical guide groove. According to the movement restriction by the cam, the liquid crystal display part is changed between portrait and landscape orientation while the bottom corner of the liquid crystal display part moves along the hinge.

It is preferred that the cam includes an elastic member for biasing the liquid crystal display part to change the orientation at least to portrait or landscape.

By adjusting the biasing force of the elastic member to the liquid crystal display part, the elastic member assists the liquid crystal display part to change the orientation from portrait to landscape, landscape to portrait or in both ways.

It is preferred that the elastic member is a torsion coil spring which is fixed to the first guide pin at one end and to the first housing at the other end.

Accordingly, the elastic member is achieved by a simple and hard-to-break structure.

It is preferred that a cable housing bulging toward the first housing is formed on a portion of the rear surface of the liquid crystal display part facing the vertical guide groove and an electric cable for electrically connecting the liquid crystal display part and the first housing is arranged in the cable housing to be slightly inclined with respect to the rear surface of the liquid crystal display part.

When the liquid crystal display part is supported on the first housing such that the orientation is changeable between portrait and landscape, the electric cable generally arranged to pass in the vertical direction to the rear surface of the liquid crystal display part in a through hole formed in the support shaft for supporting the liquid crystal display part on the first housing. Therefore, the electric cable is folded over near the through hole, thereby increasing the total thickness of the first housing and the liquid crystal display part more than twice the diameter of the electric cable. However, according to the present invention, the electric cable is arranged to be slightly inclined with respect to the rear surface of the liquid crystal display part in the cable housing bulging toward the first housing. Therefore, the electric cable is connected to the liquid crystal display part without a need of folding the electric cable near the cable housing and the total thickness of the first housing and the liquid crystal display part is not increased more than twice the outer diameter of the electric cable.

It is preferred that a through hole is formed in the axial center of the second guide pin and the electric cable for electrically connecting the liquid crystal display part and the first housing passes through the through hole in the second guide pin.

As the electric cable passes through the second guide pin which moves the least when the liquid crystal display part is changed between portrait and landscape orientation, the electric cable moves less upon changing the orientation.

It is preferred that the horizontal guide groove, vertical guide groove, first guide pin and second guide pin are assembled into a unit.

As the cam is assembled into a unit, the first and second guide pins are precisely arranged in the guide grooves and the cam is easily attached to the first housing.

DETAILED DESCRIPTION OF THE INVENTION

Hereinafter, preferred embodiments of the present invention will be explained with reference to the drawings.

Figure 1:
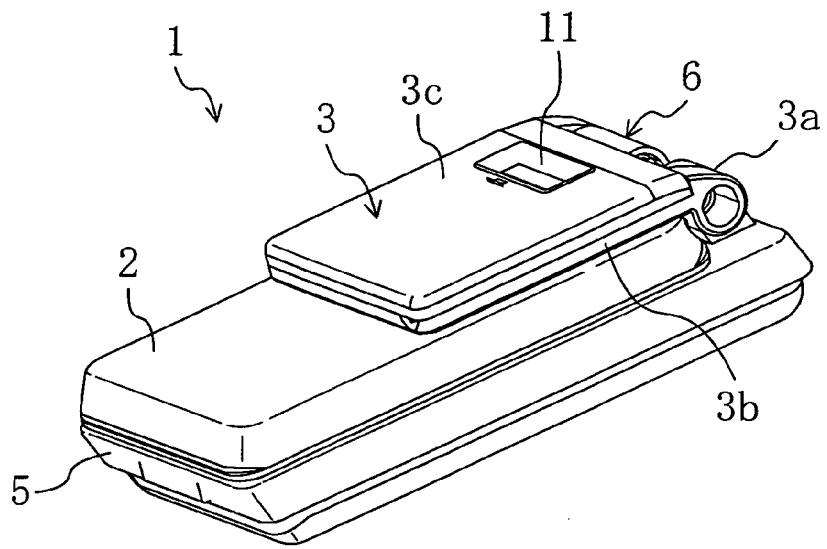
FIG. 1 is an oblique view illustrating a folding cellular phone according to an embodiment of the present invention in a closed state.
Figure 2:
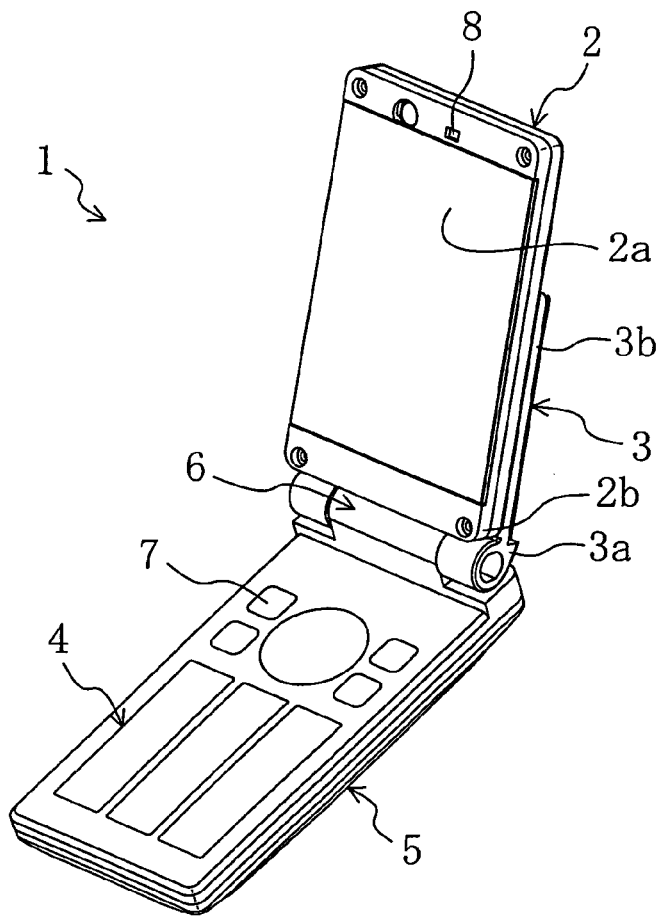
FIG. 2 is an oblique view illustrating the folding cellular phone in an opened state with a liquid crystal display part in the portrait orientation.
Figure 3:
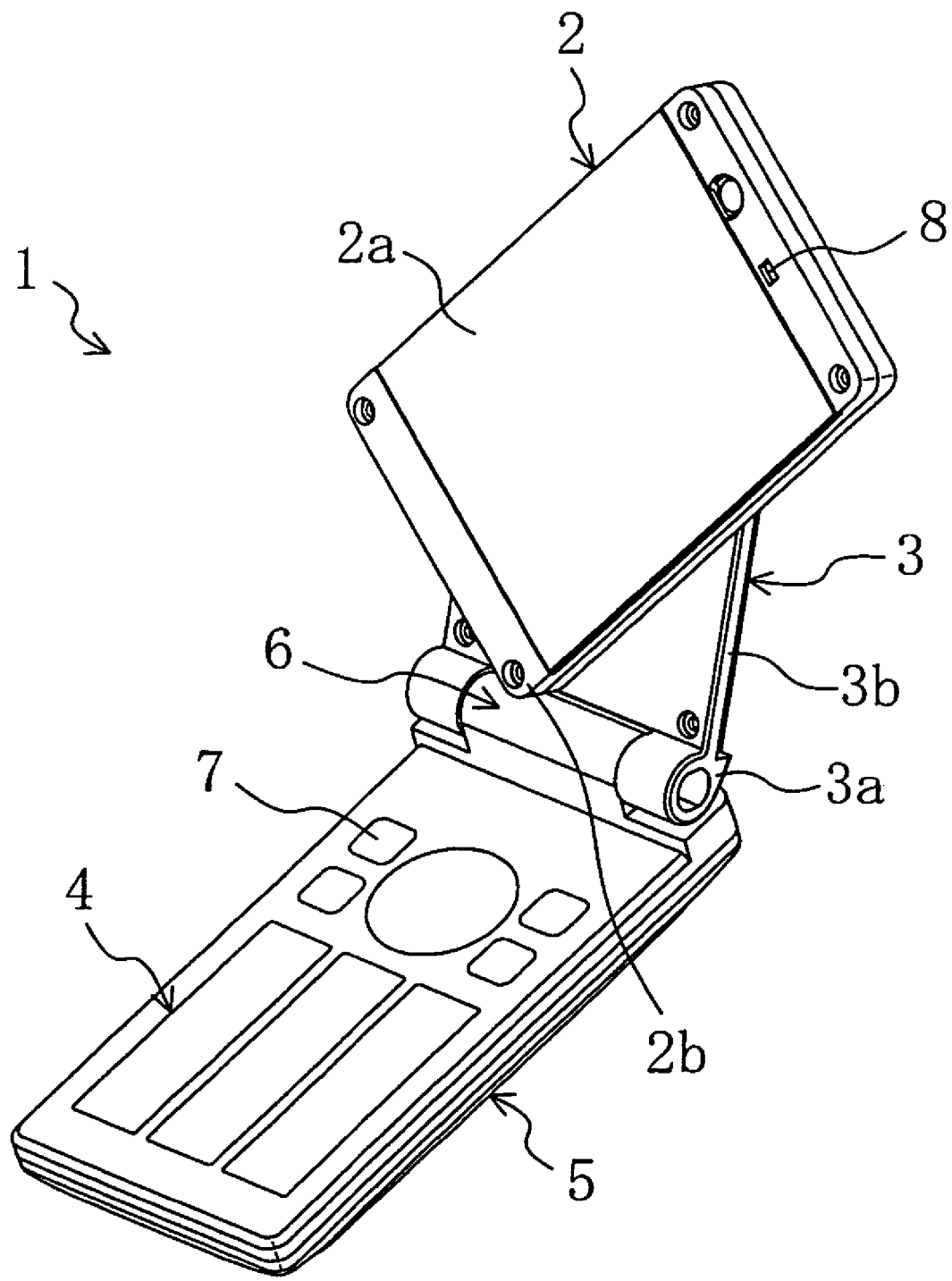
FIG. 3 is an oblique view illustrating the folding cellular phone with the liquid crystal display part changing to the portrait or landscape orientation.
Figure 4:
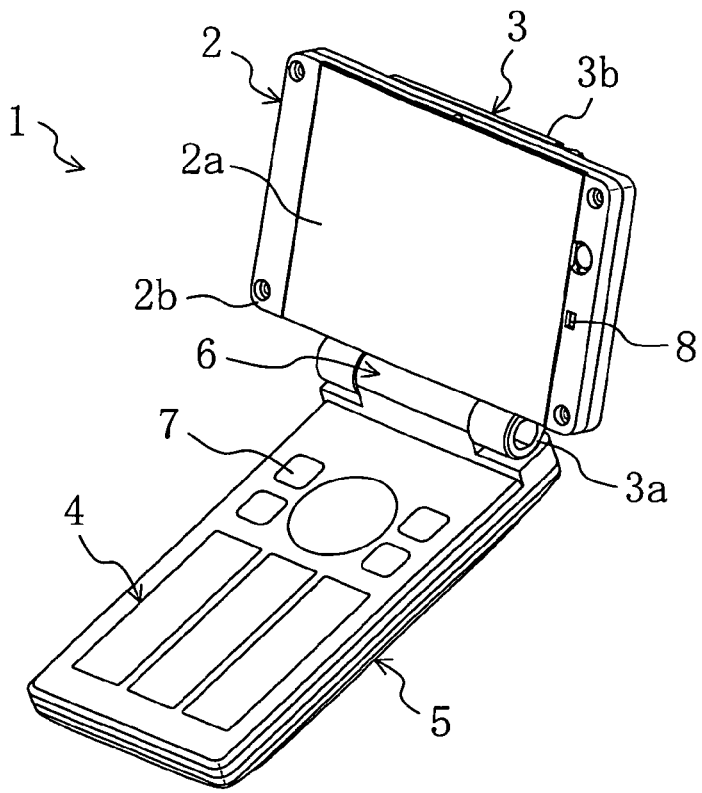
FIG. 4 is an oblique view illustrating the folding cellular phone in the opened state with the liquid crystal display part in the landscape orientation.

FIG. 1 is an oblique view illustrating a folding cellular phone according to an embodiment of the present invention in a closed state. FIG. 2 is an oblique view illustrating the folding cellular phone in an opened state and a liquid crystal display part in the portrait orientation. FIG. 3 is an oblique view illustrating the folding cellular phone in a state where the liquid crystal display part is changing to the portrait or landscape orientation. FIG. 4 is an oblique view illustrating the folding cellular phone in the opened state and the liquid crystal display part in the landscape orientation.

The folding cellular phone 1 of the present embodiment includes a first housing 3 provided with a liquid crystal display part 2 on the surface thereof, a second housing 5 including an operation part 4 formed on the surface thereof and a hinge 6 for connecting the first and second housings 3 and 5 in a pivotable manner to open/close the folding cellular phone 1. The first and second housings 3 and 5 are electrically connected by a connecting means (not shown) in the hinge 6.

Thus, the folding cellular phone 1 is changeable between the closed state shown in FIG. 1 and the opened state shown in FIG. 2.

The operation part 4 of the second housing 5 includes a plurality of operation keys 7. The operation keys 7 are arranged such that the user can do input smoothly when he/she holds the folding cellular phone 1 in the portrait orientation and provided with markings on their surfaces. Various functions of the folding cellular phone 1 are available through the operation with the operation keys 7. The second housing 5 is also provided with a microphone for communication (not shown).

As shown in FIGS. 5 to 10, the first housing 3 is provided with a cam 10 serving as a support mechanism for supporting the liquid crystal display part 2 in the form of an almost rectangular plate such that the orientation of the liquid crystal display part 2 is changeable between portrait and landscape. The first housing 3 includes a first housing body 3b provided with bosses 3a at both ends of the bottom side for receiving a shaft (not shown) of the hinge 6 and a rear cover 3c (omitted for explanation in FIGS. 2 to 7) in the form of a rectangular dish for covering the first housing body 3b.

The liquid crystal display part 2 has a linear side which comes to the bottom when the liquid crystal display part 2 is portrait-oriented. A rectangular liquid crystal display 2a is provided on the almost entire surface of the liquid crystal display part 2. A speaker 8 for communication is provided at an end portion of the liquid crystal display part 2 which comes to the top when the liquid crystal display part 2 is portrait-oriented. The corners of the liquid crystal display part 2, including a bottom corner 2b, are chamfered for design and safety purposes.

Figure 8:
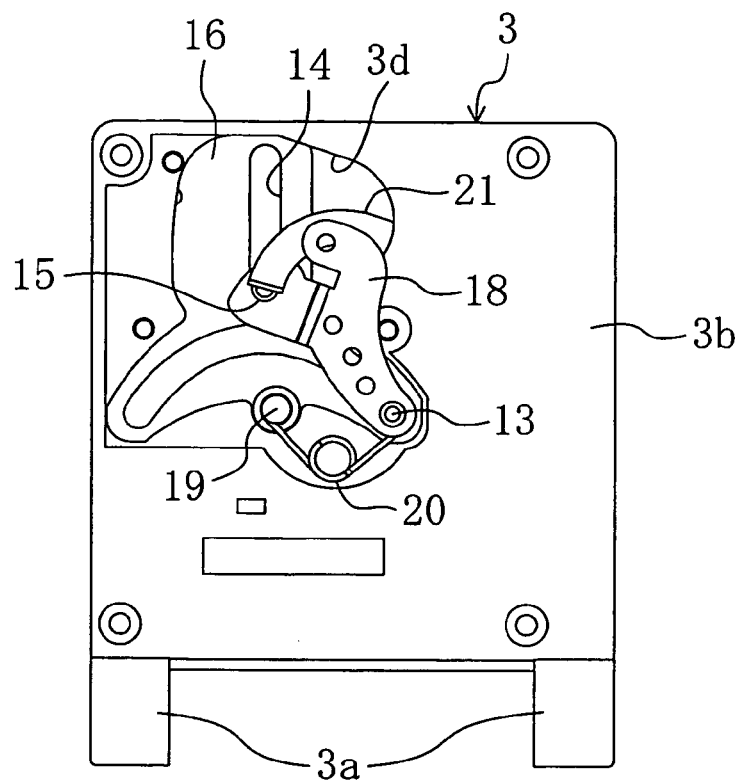
FIG. 8 is a front view illustrating a cam and the vicinity when the liquid crystal display part is portrait-oriented.
Figure 9:
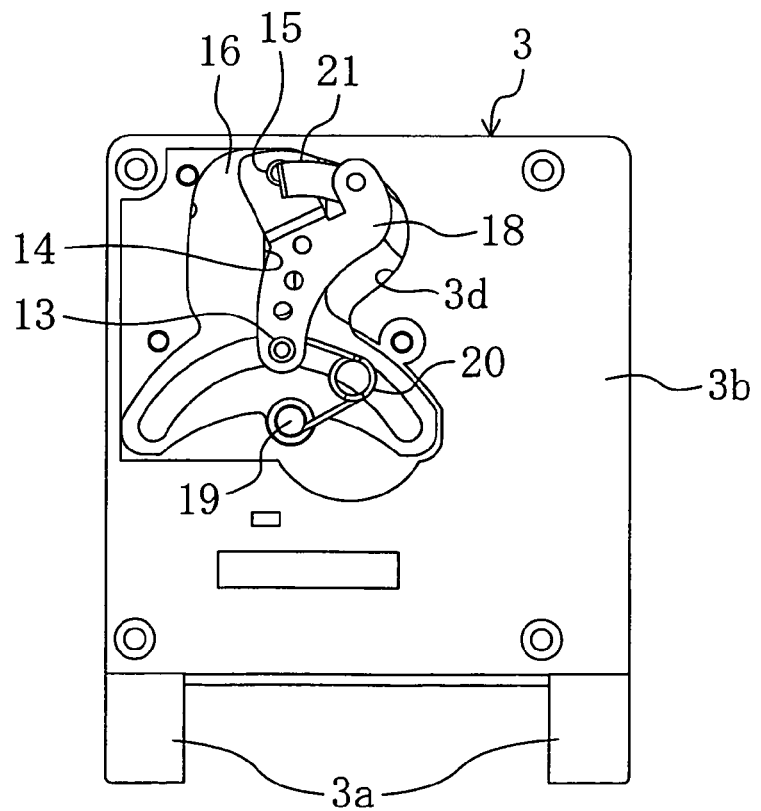
FIG. 9 is a front view illustrating the cam and the vicinity when the liquid crystal display part is changing to the portrait or landscape orientation.
Figure 10:
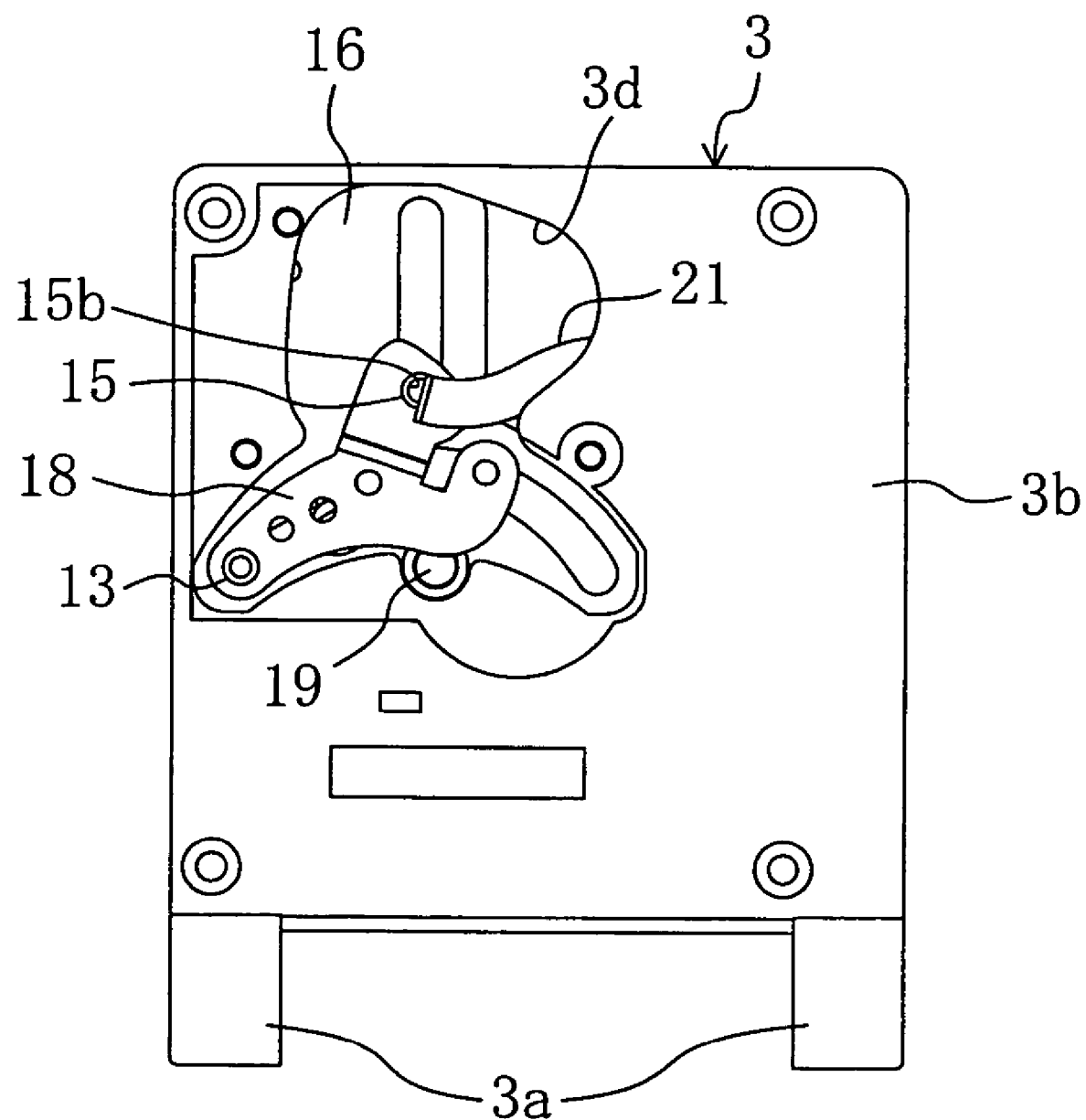
FIG. 10 is a front view illustrating the cam and the vicinity when the liquid crystal display part is landscape-oriented.

As shown in FIGS. 8 to 10, a cam opening 3d is provided in an upper left portion of the front surface of the first housing 3 (the surface facing the liquid crystal display part 2). Below the cam opening 3d, a rear liquid crystal display 11 is provided for indicating time or other information when the cellular phone is closed.

The liquid crystal display part 2 and the operation part 4 come into sight when the cellular phone 1 is opened. Therefore, whether the liquid crystal display part 2 is portrait- or landscape-oriented, the user handles the operation keys 7 of the operation part 4 in the portrait orientation looking at the liquid crystal display 2a of the liquid crystal display part 2.

Figure 11:
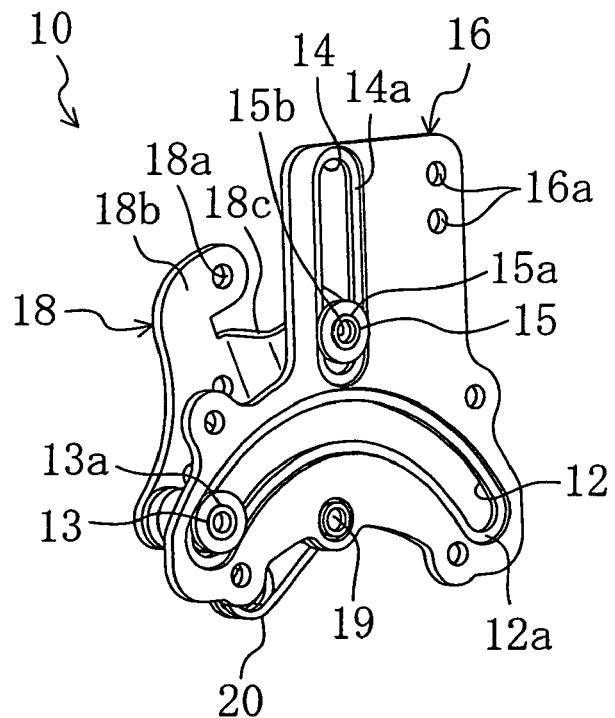
FIG. 11 is an oblique back view of the cam.
Figure 12:
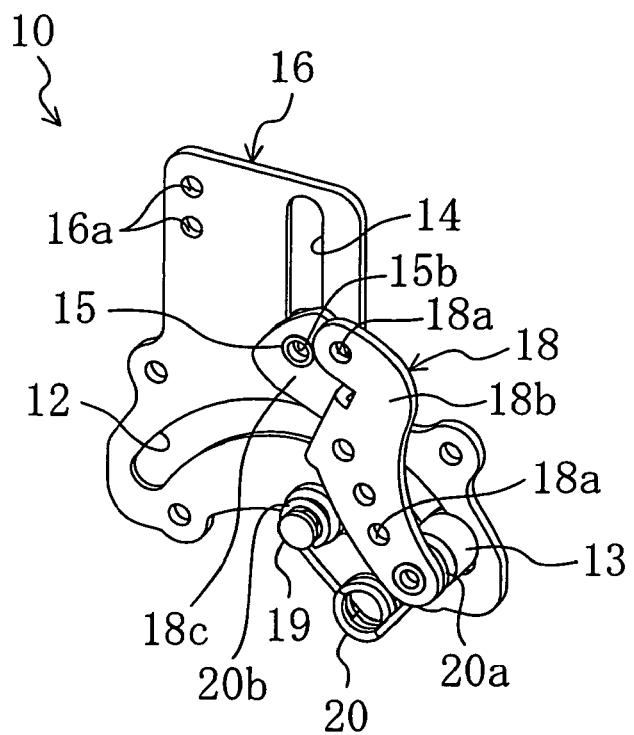
FIG. 12 is an oblique front view of the cam.
Figure 13:
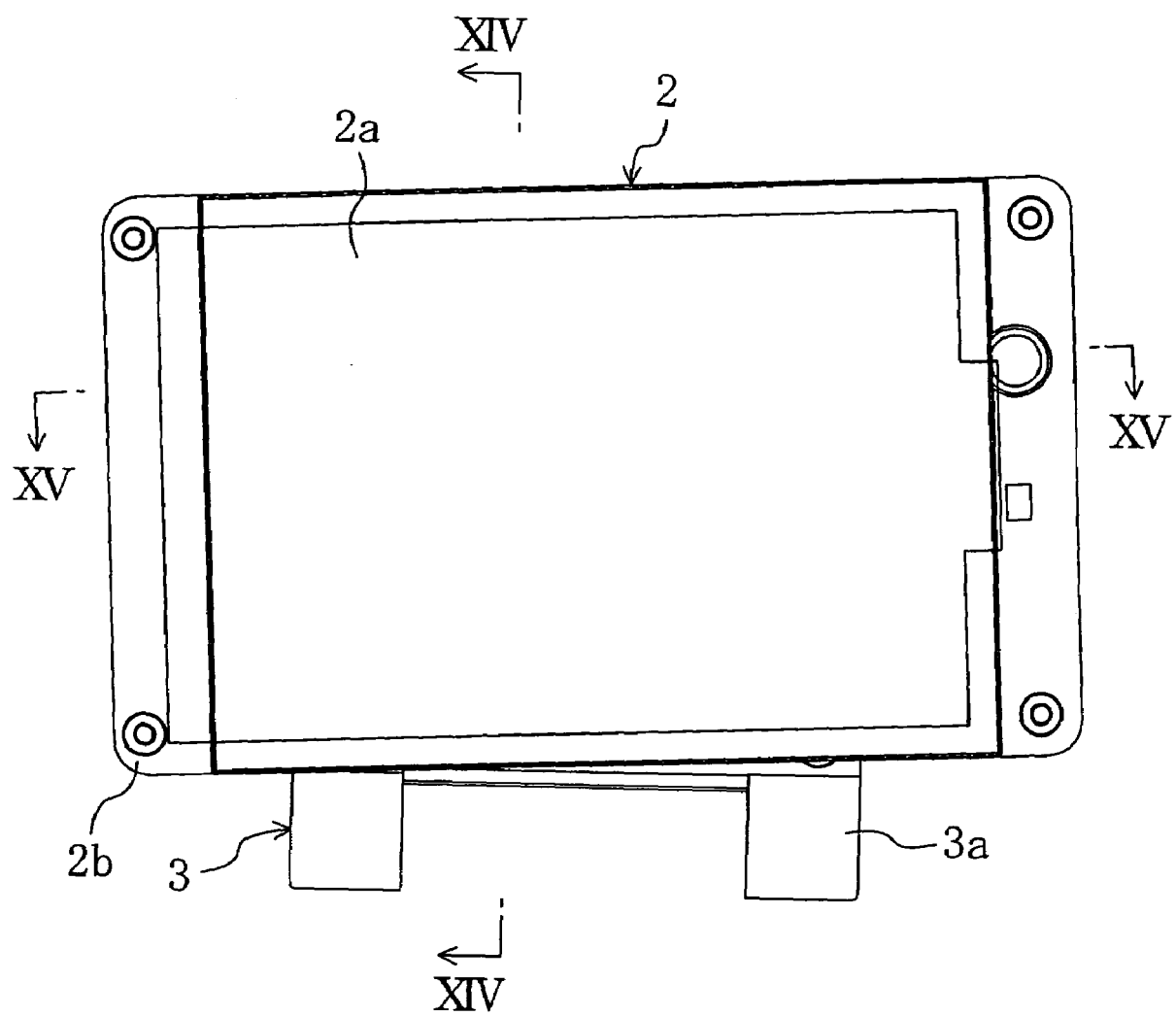
FIG. 13 is a front view illustrating the liquid crystal display part which is changing to the portrait or landscape orientation.

As shown in FIGS. 11 and 12, the cam 10 includes a horizontal guide groove 12 which is formed in the first housing 3 to extend in the horizontal direction in the form of an upward convex arc, a vertical guide groove 14 which is formed in the first housing 3 to extend straight in the vertical direction, a first guide pin 13 which is arranged on the rear surface of the liquid crystal display part 2 to slidably engage with the horizontal guide groove 12 and a second guide pin 15 which is arranged on the rear surface of the liquid crystal display part 2 to slidably engage with the vertical guide groove 14.

Figure 14:
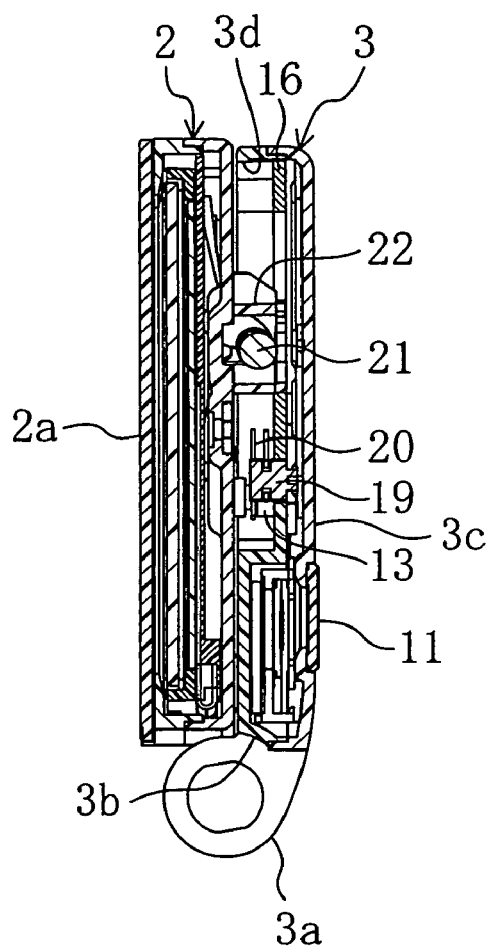
FIG. 14 is a sectional view taken along the line XIV-XIV shown in FIG. 13.
Figure 15:
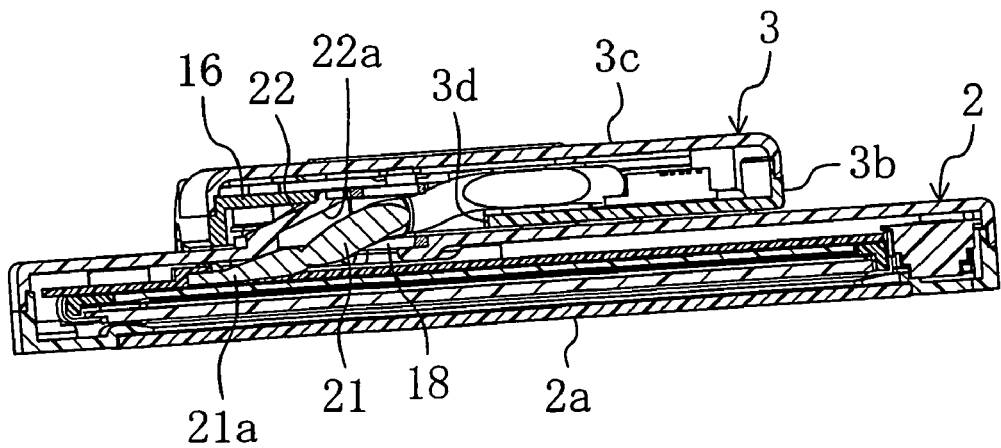
FIG. 15 is a sectional view taken along the line XV-XV shown in FIG. 13.

Specifically, the horizontal guide groove 12 and the vertical guide groove 14 are formed in a metallic guide plate 16 attached to the first housing 3. The vertical guide groove 12 is an opening in the form of an upward convex arc and the center thereof is shifted to the right when viewed from the back of the folding cellular phone 1. The vertical guide groove 14 is a linear opening which is formed above the uppermost part of the horizontal guide groove 12 to extend in the vertical direction. On the surface of the guide plate 16 opposite to the liquid crystal display part 2, steps 12a and 14a are formed at the peripheries of the guide grooves 12 and 14, respectively. The guide plate 16 is positioned in the middle of the thickness of the first housing 3 as shown in FIGS. 14 and 15 and fixed to the first housing body 3b with screws (not shown) inserted in through holes 16a. The second guide pin 15 corresponding to a conventional support shaft extending vertical to the liquid crystal display part 2 is off-centered to be positioned at an upper right portion of the first housing 3 when viewed from the back of the folding cellular phone 1.

On the rear surface of the liquid crystal display part 2, a metallic linking member 18 is attached. The linking member 18 has a plate-shaped mounting part 18b provided with through holes 18a for fixing or positioning the linking member 18 to or at the rear surface of the liquid crystal display part 2 and a tip portion 18c continuously extending from the mounting part 18b in the form of L when viewed from the side. The first guide pin 13 is provided at an end portion of the linking member 18, i.e., an end portion of the mounting part 18b, to extend vertical to the first housing 3. The second guide pin 15 is provided at the other end portion of the linking member 18, i.e., an end portion of the tip portion 18c, to extend vertical to the first housing 3. The tips of the guide pins 13 and 15 are tapered to such a degree that the tips are inserted into the guide grooves 12 and 14. The tapered tips of the guide pins 13 and 15 are inserted into the guide grooves 12 and 14 and then riveted to form ring-shaped heads 13a and 15a. The ring-shaped heads 13a and 15a slide on the steps 12a and 14a, respectively. Thus, the guide pins 13 and 15 are prevented from coming off the guide grooves 12 and 14 and the liquid crystal display part 2 is slidably engaged with the first housing 3 without coming off.

A pin 19 for fixing a spring is formed at a bottom portion of the guide plate 16 to extend vertical toward the liquid crystal display part 2. A torsion coil spring 20 as an elastic member is fixed to the pin 19. Both ends 20a and 20b of the torsion coil spring 20 are coiled in a loop. The end 20a is rotatably fitted around the first guide pin 13 and the end 20b is rotatably fitted around the pin 19. Accordingly, the torsion coil spring 20 is supported to move from side to side on the pin 19. The elastic force of the torsion coil spring 20 biases the liquid crystal display part 2 to change the orientation from portrait to landscape and vice versa. Specifically, when the first guide pin 13 comes to the closest position to the pin 19 as in the state shown in FIG. 3 (when the second guide pin 15 comes to the top of the vertical guide groove 14), an angle of deflection of the torsion coil spring 20 becomes the maximum. When the first guide pin 13 is shifted to the right or left from that position, the liquid crystal display part 2 is oriented portrait or landscape.

The guide grooves 12 and 14, the first and second guide pins 13 and 15 and the torsion coil spring 20 is assembled into a unit and this cam unit 10 is attached to the first housing 3. The moving parts of the cam 10, i.e., the guide pins 13 and 15 and the torsion coil spring 20, move within the cam opening 3d.

Figure 5:
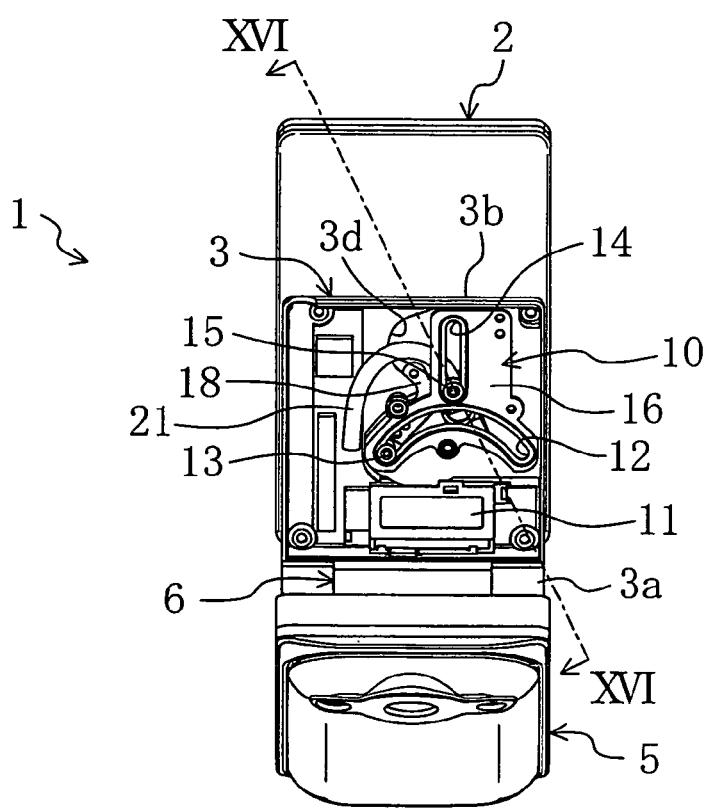
FIG. 5 is a back view of the folding cellular phone when the liquid crystal display part is portrait-oriented.
Figure 6:
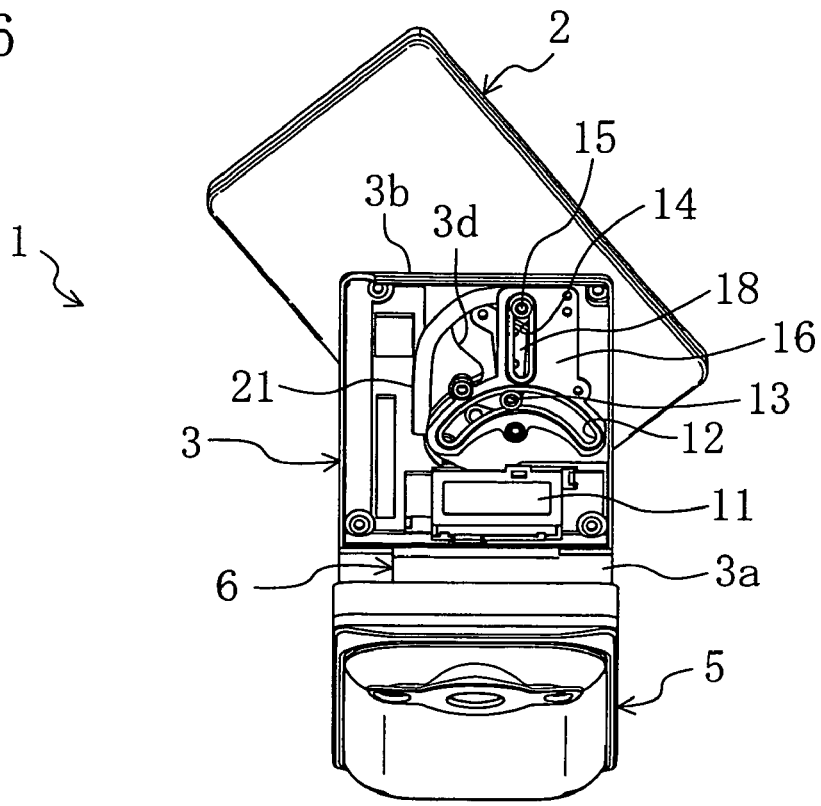
FIG. 6 is a back view of the folding cellular phone when the liquid crystal display part is changing to the portrait or landscape orientation.
Figure 7:
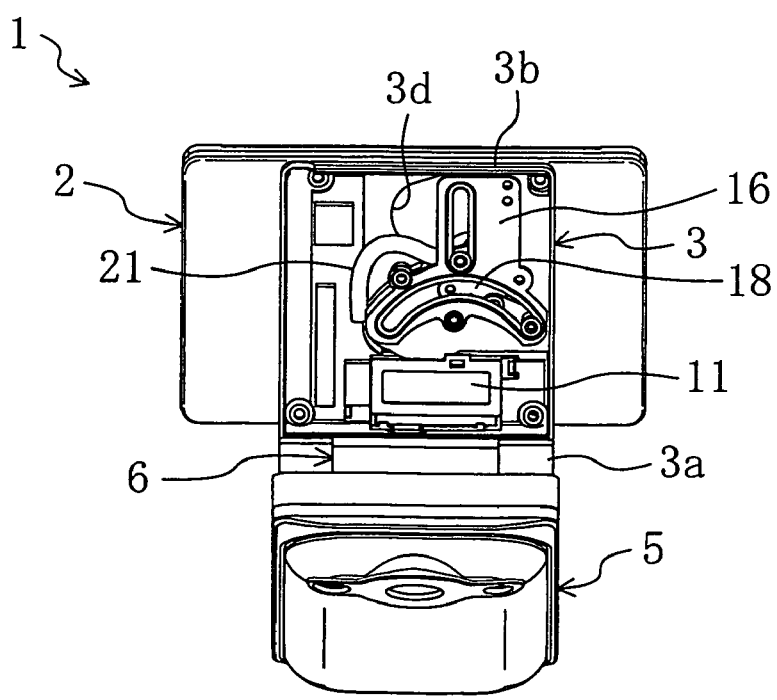
FIG. 7 is a back view of the folding cellular phone when the liquid crystal display part is landscape-oriented.
Figure 16:
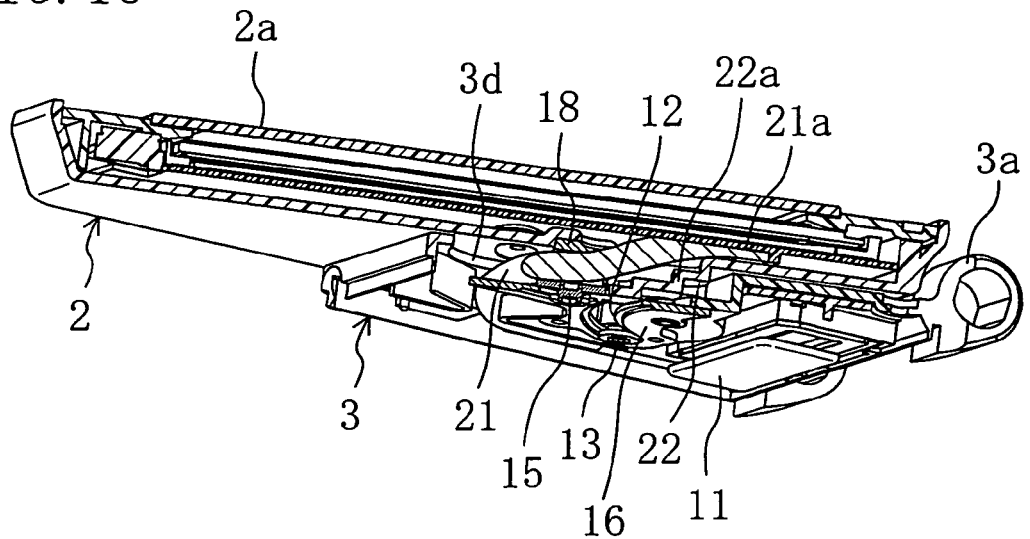
FIG. 16 is an oblique view illustrating the section cut along the line XVI-XVI shown in FIG. 5.

As shown in FIGS. 13 to 16, a cable housing 22 for passing an electric cable 21 therein is provided at the rear surface of the liquid crystal display part 2. The electric cable 21 is connected to the rear surface of the liquid crystal display 2a at an end 21a and to a connecting means of the hinge 6 at the other end, thereby establishing electric connection between the liquid crystal display part 2 and the first housing 3 (second housing 5). For the sake of brevity, the electric cable 21 is partially shown in the figures. The cable housing 22 is in the form of a narrow rectangle when viewed from the back of the liquid crystal display part 2. As viewed from the side, a bottom wall 22a of the cable housing 22 is slightly inclined with respect to the rear surface of the liquid crystal display part 2. Further, an opening is formed in an end wall of the cable housing 22 continuous from the inclined bottom wall 22a and close to the rear surface of the first housing 3, so that the electric cable 21 arranged in the cable housing 22 to be slightly inclined with respect to the rear surface of the liquid crystal display part 2 passes through the opening. As shown in FIGS. 15 and 16, the electric cable 21 is arranged not to be folded over between the liquid crystal display part 2 and the first housing 3. The cable housing 22 is configured to move within the cam opening 3d of the first housing 3. As shown in FIGS. 5 to 7, the electric cable 21 is arranged substantially in the form of an inverted-U when viewed from the back so as not to hinder the movement of the cam 10 when the orientation of the liquid crystal display part 2 is changed to portrait or landscape.

Next, an explanation of how the folding cellular phone 1 according to the present embodiment works will be provided.

As shown in FIG. 1, when not used or in a stand-by state, the folding cellular phone 1 is closed.

As shown in FIG. 2, when the cellular phone 1 is opened, the liquid crystal display part 2 and the operation part 4 come into sight. To talk on the phone or send an e-mail, the liquid crystal display part 2 is kept in the portrait orientation and the user does input with the operation keys 4.

When the landscape orientation is preferred, for example, to watch a landscape image of the digital terrestrial television broadcasting or prepare or read e-mails in English, the user rotates the portrait liquid crystal display part 2 to change the display orientation to landscape.

First, as viewed from the front, the user rotates the liquid crystal display part 2 clockwise against the biasing force of the torsion coil spring 20 such that the bottom corner 2b comes to the position as shown in FIG. 3. At this time, as shown in FIGS. 5 and 6 illustrating the back views of the folding cellular phone 1, the second guide pin 15 positioned at the bottom end of the vertical guide groove 14 moves to the top end and the first guide pin 13 positioned at the left end of the vertical guide groove 12 moves to the center.

When the torsion coil spring 20 goes beyond the position where the angle of deflection is the maximum, the liquid crystal display part 2 is changed to the landscape orientation with the help of the biasing force of the torsion coil spring 20. At this time, as shown in FIGS. 6 and 7, the second guide pin 15 positioned at the top end of the vertical guide groove 14 moves to the bottom end and the first guide pin 13 positioned at the center of the horizontal guide groove 12 moves to the right end.

In the cam 10, the first guide pin 13 of the liquid crystal display part 2 slides in the horizontal guide groove 12 and at the same time, the second guide pin 15 of the liquid crystal display part 2 slides in the vertical guide groove 14.

Figure 17:
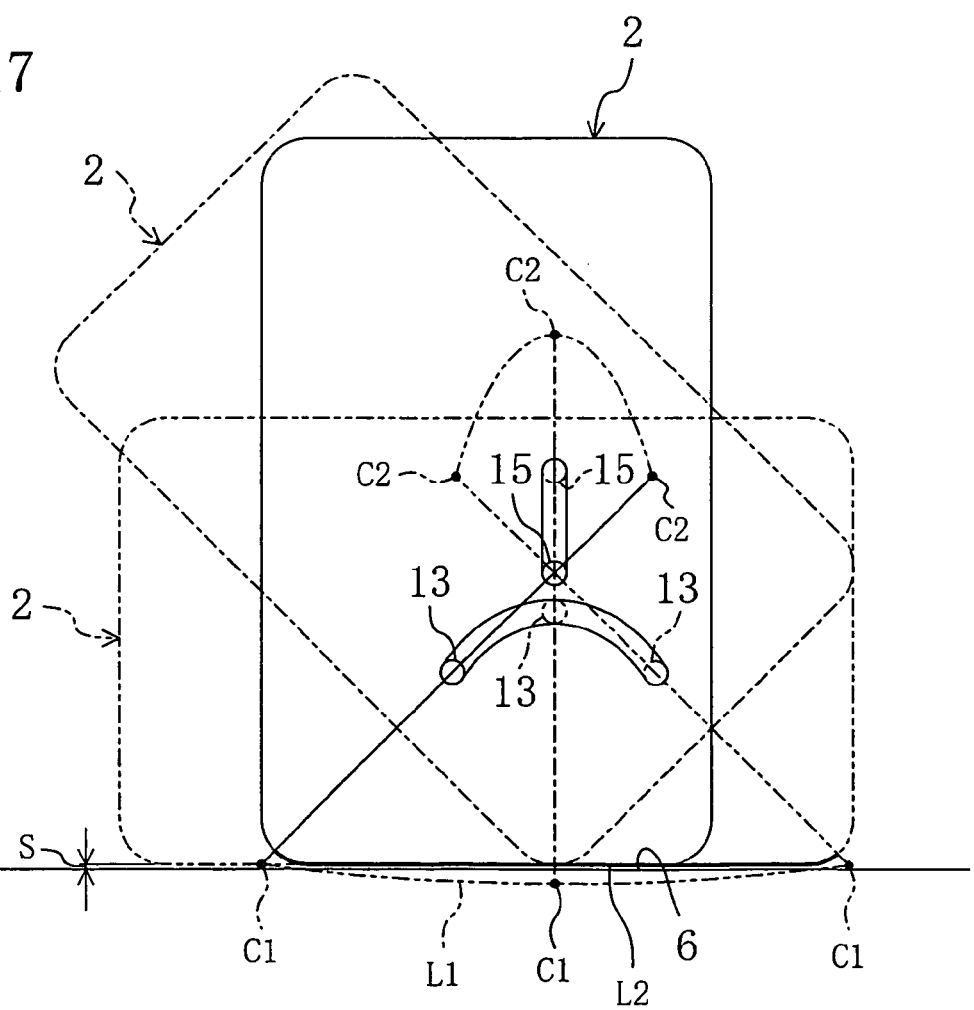
FIG. 17 is a view illustrating the locus of a bottom corner of the first housing.

FIG. 17 shows a locus of a point C2 which lies on the line formed by connecting the vertex C1 of the bottom corner 2b and the second guide pin 15 under the movement restriction by the cam 10. At this time, the vertex C1 of the bottom corner 2b forms a locus L1 which overlaps the hinge 6. However, since the bottom corner 2b is actually rounded, the lowermost part of the rounded corner draws a linear locus L2 while keeping a certain clearance S from the hinge 6. As the liquid crystal display part 2 does not go below the locus L2, the liquid crystal display part 2 is rotated without contacting the hinge 6 even if the bottom end of the liquid crystal display part 2 is not rounded to form an arc corresponding to the circumference of a circle having the support shaft of the liquid crystal display part 2 as the center.

Further, as the electric cable 21 moves within the cam opening 3d of the first housing 1 while being covered with the cable housing 22, the electric cable 21 is not tangled with other components.

Even in the landscape orientation as shown in FIG. 4, the horizontal center of the liquid crystal display part 2 is positioned substantially at the horizontal center of the first housing 3. A landscape image is displayed full on the screen of the landscape liquid crystal display 2a, and then the user does input with the operation keys of the operation part 4 to take part in a quiz show, do shopping or complete payment to a bank account through the display.

After use, the liquid crystal display part 2 is rotated counterclockwise when viewed from the front against the biasing force of the torsion coil spring 20. When the torsion coil spring 20 goes beyond the position where the angle of deflection is the maximum, the liquid crystal display part 2 returns to the portrait orientation with the help of the biasing force.

Then, the cellular phone 1 is closed to be in the standby state.

Thus, according to the folding cellular phone 1 of the present embodiment, the liquid crystal display part 2 is supported on the first housing 3 by the cam 10 such that the orientation is changeable between portrait and landscape. The cam 10 supports and guides the liquid crystal display part 2 such that the bottom corner 2b of the liquid crystal display part 2 moves along the hinge 6 when the orientation of the liquid crystal display part 2 is changed. Therefore, the liquid crystal display part 2 is enlarged without increasing the size of the cellular phone 1 itself. Further, the orientation of the liquid crystal display part 2 is easily changed between portrait and landscape and the user can use the operation part 4 in the portrait orientation as usual even when the liquid crystal display 2a is landscape-oriented.

According to the present embodiment, the cam 10 serves as the support mechanism. Therefore, the orientation of the liquid crystal display part 2 is surely changed while the bottom corner 2b of the liquid crystal display part 2 moves along the hinge 6 without receiving any interference.

According to the present embodiment, the cam 10 makes it possible to switch the orientation of the liquid crystal display part 2 without receiving any interference while the horizontal center of the liquid crystal display part 2, regardless of whether portrait- or landscape-oriented, is positioned substantially at the horizontal center of the first housing 3. Therefore, the display screen is enlarged as much as possible and the liquid crystal display part 2 is positioned substantially at the horizontal center of the cellular phone 1 regardless of the orientation thereof. Thus, the folding cellular phone 1 is provided with good looks, a visible liquid crystal display and ease of operation.

According to the present embodiment, the liquid crystal display part 2 has a linear side which comes to the bottom in the portrait orientation. The cam 10 supports the liquid crystal display part 2 such that the bottom corner 2b moves along the hinge 6 to draw a linear locus L2 when the orientation of the liquid crystal display part 2 is changed between portrait and landscape. Therefore, the display screen is enlarged nearly to the bottom end of the portrait liquid crystal display part 2. Thus, the folding cellular phone 1 is provided with a larger display and greater ease of operation.

According to the present embodiment, the orientation of the liquid crystal display part 2 is changed to portrait or landscape by rotating the liquid crystal display part 2 such that the bottom corner 2b moves along the hinge 6 while the first guide pin 13 is engaged with and slides on the horizontal guide groove 12 and the second guide pin 15 is engaged with and slides with the vertical guide groove 14. Thus, the orientation of the liquid crystal display part 2 is easily and surely changed to portrait or landscape with a simple structure without receiving any interference.

According to the present embodiment, the cam 10 is provided with the torsion coil spring 20 for biasing the liquid crystal display part 2 to change the orientation to portrait or landscape. Therefore, the user can change the orientation of the liquid crystal display part 2 with a single motion by a single hand.

According to the present embodiment, the torsion coil spring 20 which is simple and hard to break is connected to the first guide pin 13 at one end and to the pin 19 of the first housing 3 at the other end. Therefore, the cam 10 moves smoothly and is achieved at low cost.

According to the present embodiment, the cable housing 22 is formed in the liquid crystal display part 2 to bulge toward the first housing 3 and the electric cable 21 is arranged therein to be slightly inclined with respect to the rear surface of the liquid crystal display part 2. Therefore, the first housing 3 and the liquid crystal display part 2 are reduced in thickness and the folding cellular phone 1 becomes thin and compact.

According to the present embodiment, the cam 10 is a unit assembly including the first and second guide pins 13 and 15 arranged precisely in the guide grooves 12 and 14. Therefore, the cam 10 is easily installed. Further, if the cam 10 is made of metal, the cam 10 moves more smoothly and increases rigidity.

Other Embodiments

The folding cellular phone of the present invention may also have the following structures.

Figure 18:
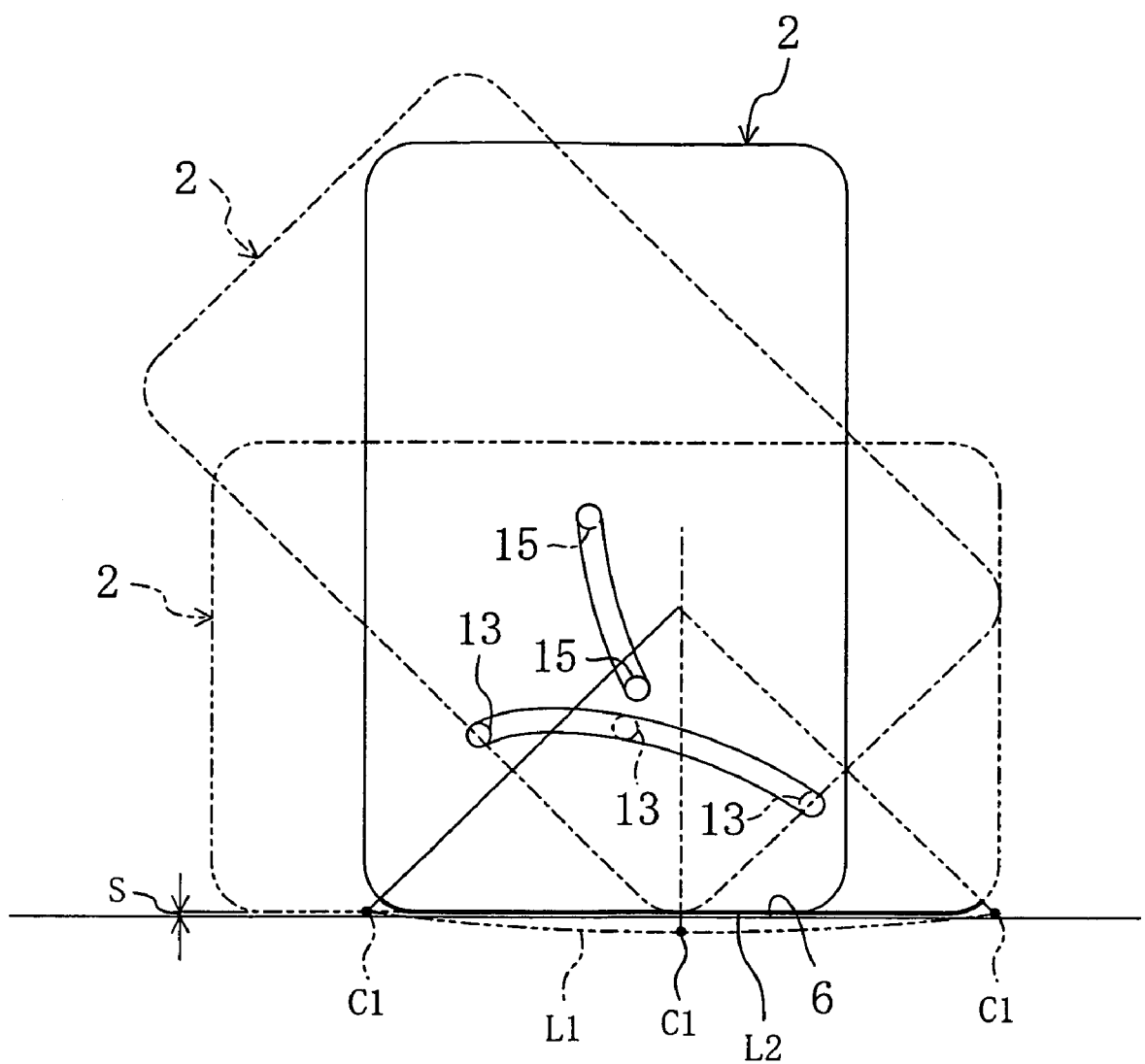
FIG. 18 is a view corresponding to FIG. 17 illustrating another embodiment of the present invention.

The horizontal guide groove 12 and the vertical guide groove 14 are not limited to have the shapes as described above. For example, the guide grooves may be shaped as shown in FIG. 18. Also in this case, the lowermost part of the rounded bottom corner 2b is guided to move along the linear locus L2 while keeping a certain clearance S from the hinge 6.

In the above-described embodiment, the liquid crystal display part 2 is supported and guided by the cam 10 such that the bottom corner 2b of the liquid crystal display part 2 moves to along the hinge 6 to draw the linear locus L2. However, the bottom corner 2b may draw a curved locus L2. In this case, the shape of the horizontal guide groove 12 changed to control the locus L2. By so doing, a camera may be arranged in a bulge between the bottom side of the first housing 3 and the hinge 6. Also in this case, the bottom corner 2b of the liquid crystal display part 2 is prevented from receiving the interference of the bulge.

The number of the horizontal guide groove 12 may be increased to two. In this case, a second horizontal guide groove in the form of a tighter upward convex arc is formed above the horizontal guide groove 14 to be engaged with another first guide pin formed on the linking member 18. For example, the second horizontal guide groove may be formed on the locus drawn by the point C2 shown in FIG. 17. By so doing, the liquid crystal display part 2 is firmly supported such that the orientation thereof is smoothly changeable between portrait and landscape and the liquid crystal display part 2 is resistant against pulling force away from the first housing 3.

In the above-described embodiment, the horizontal guide groove 12, vertical guide groove 14, first guide pin 13 and second guide pin 15 are assembled into a unit, but these components may not be assembled into a unit. For example, the horizontal and vertical guide grooves 12 and 14 are integrally formed in the first housing body 3b of the first housing 3 and the first and second guide pins 15 may be integrated with the rear surface of the liquid crystal display part 2.

According to the above-described embodiment, the electric cable 21 is arranged to pass through the cable housing 22 to be slightly inclined with respect to the rear surface of the liquid crystal display part 2. However, the electric cable 21 may pass through a through hole 15b (shown in FIG. 10) formed in the second guide pin 15. By so doing, the electric cable 21 moves less because the second guide pin 15 moves the least when the orientation is changed. Further, the electric cable 21 is arranged easily.

According to the above-described embodiment, the torsion coil spring 20 is arranged to bias the liquid crystal display part 2 to change the orientation to portrait and landscape. However, the torsion coil spring 20 may bias the liquid crystal display part 2 to change the orientation to portrait or landscape only.

According to the above-described embodiment, the cam 10 rotates the liquid crystal display part 2 clockwise as viewed from the front to change the orientation from portrait to landscape. However, the liquid crystal display part 2 may be rotated counterclockwise to change the orientation.

According to the above-described embodiment, the horizontal center of the portrait- or landscape-oriented liquid crystal display device 2 is positioned substantially at the horizontal center of the first housing 3. However, the horizontal center of the liquid crystal display part 2 may be shifted to the right or left.

According to the above-described embodiment, the support mechanism is achieved by the cam 10, but this is not limitative. Specifically, the support mechanism may be any structure as long as it supports and guides the liquid crystal display part 2 such that the bottom corner 2b of the liquid crystal display part 2 moves along the hinge 6 when the orientation of the liquid crystal display part 2 is changed between portrait and landscape.

In the above-described embodiment, the liquid crystal display part 2 is provided with the liquid crystal display 2a. However, the liquid crystal display 2a may be replaced with an organic electroluminescence display.

The above-described embodiment is given as an essentially preferable example and does not limit the present invention, the object of the present invention and the scope of application of the present invention.

What is claimed is:

1. A folding cellular phone comprising:
a first housing provided with a liquid crystal display part on the surface thereof;
a second housing including an operation part formed on the surface thereof;
a hinge for connecting the first housing and the second housing in a pivotable manner to open/close the folding cellular phone, and
a function of receiving digital television wherein
the liquid crystal display part is supported on the first housing by a support mechanism such that the orientation of the liquid crystal display part is changeable between portrait and landscape,
the support mechanism is configured to support and guide the liquid crystal display part such that a bottom corner of the liquid crystal display part moves along the hinge to draw a linear locus when the orientation of the liquid crystal display part is changed between portrait and landscape, and
the liquid crystal display part has a linear side which comes to the bottom in the portrait orientation.

2. A folding cellular phone according to claim 1, wherein the horizontal center of the portrait- or landscape-oriented liquid crystal display part is positioned substantially at the horizontal center of the first housing.

3. A folding cellular phone comprising:
a first housing provided with a liquid crystal display part on the surface thereof;
a second housing including an operation part formed on the surface thereof; and
a hinge for connecting the first housing and the second housing in a pivotable manner to open/close the folding cellular phone, wherein
the liquid crystal display part is supported on the first housing by a support mechanism such that the orientation of the liquid crystal display part is changeable between portrait and landscape,
the support mechanism is configured to support and guide the liquid crystal display part such that a bottom corner of the liquid crystal display part moves along the hinge when the orientation of the liquid crystal display part is changed between portrait and landscape, and
the support mechanism includes a first guide groove which is formed in the first housing and extends in a first direction in the form of an upward convex arc, a second guide groove which is formed in the first housing to extend straight in a second direction, a first guide pin which is arranged on the rear surface of the liquid crystal display part to slidably engage with the first guide groove and a second guide pin which is arranged on the rear surface of the liquid crystal display part to slidably engage with the second guide groove.

4. A folding cellular phone according to claim 3, wherein the support mechanism includes an elastic member for biasing the liquid crystal display part to change the orientation at least to portrait or landscape.

5. A folding cellular phone according to claim 4, wherein the elastic member is a torsion coil spring which is fixed to the first guide pin at one end and to the first housing at the other end.

6. A folding cellular phone according to claim 3, wherein a cable housing bulging toward the first housing is formed on a portion of the rear surface of the liquid crystal display part facing the second guide groove and an electric cable for electrically connecting the liquid crystal display part and the first housing is arranged in the cable housing to be slightly inclined with respect to the rear surface of the liquid crystal display part.

7. A folding cellular phone according to claim 3, wherein a through hole is formed in the axial center of the second guide pin and the electric cable for electrically connecting the liquid crystal display part and the first housing passes through the through hole in the second guide pin.

8. A folding cellular phone according to claim 3, wherein the first guide groove, second guide groove, first guide pin and second guide pin are assembled into a unit.

9. A folding cellular phone according to claim 3, wherein the first guide groove extends in a horizontal direction in the form of the upward convex arc.

10. A folding cellular phone according to claim 3, wherein the second guide groove extends straight in a vertical direction.

11. A folding cellular phone according to claim 3, wherein the first guide groove extends in a horizontal direction in the form of the upward convex arc, and the second guide groove extends straight in a vertical direction.

12. A folding cellular phone, comprising:
- a first housing provided with a liquid crystal display part on the surface thereof;
- a second housing including an operation part formed on the surface thereof; and
- a hinge for connecting the first housing and the second housing in a pivotable manner to open/close the folding cellular phone, wherein
- the liquid crystal display part is supported on the first housing by a support mechanism such that the orientation of the liquid crystal display part is changeable between portrait and landscape,
- the support mechanism is configured to support and guide the liquid crystal display part such that a bottom corner of the liquid crystal display part moves along the hinge to draw a linear locus when the orientation of the liquid crystal display part is changed between portrait and landscape,
- the liquid crystal display part has a linear side which comes to the bottom in the portrait orientation, and
- a the support mechanism includes an elastic member for biasing the liquid crystal display part to change the orientation at least to portrait or landscape.

13. A folding cellular phone according to claim 12, wherein
- the horizontal center of the portrait- or landscape-oriented liquid crystal display part is positioned substantially at the horizontal center of the first housing.

* * * * *